United States Patent [19]

Hirzy

[11] 4,049,611
[45] Sept. 20, 1977

[54] MODIFIED POLYESTER POLYBLENDS AND PREPARATION THEREOF

[75] Inventor: John William Hirzy, St. Louis, Mo.

[73] Assignee: Monsanto Company, St. Louis, Mo.

[21] Appl. No.: 633,207

[22] Filed: Nov. 19, 1975

[51] Int. Cl.² .................. C07C 69/34; C08K 5/11; C08K 5/12

[52] U.S. Cl. .................. 260/31.6; 260/75 T; 260/75 TN; 260/404.8; 260/860; 560/190

[58] Field of Search .................. 260/860, 31.6, 75 T, 260/75 TN, 485 G

[56] References Cited

U.S. PATENT DOCUMENTS

| | | | |
|---|---|---|---|
| 2,606,162 | 8/1952 | Coffey et al. | 260/22 |
| 2,844,560 | 7/1958 | Greenberg et al. | 260/45.4 |
| 3,049,506 | 8/1962 | Kibler et al. | 260/45.4 |
| 3,553,157 | 1/1971 | Dijkstra et al. | 260/40 |

*Primary Examiner*—Stanford M. Levin
*Attorney, Agent, or Firm*—Robert E. Wexler; Edward P. Grattan; George R. Beck

[57] ABSTRACT

Polyblends are disclosed comprising terminated polyesters, coupled polyesters derived from partially terminated polyesters and coupled polyesters derived from non-terminated polyesters. The polyblends are prepared by reacting a dicarboxylic acid, a glycol and a monocarboxylic acid or monohydric alcohol under esterification conditions and subsequently treating the reaction mixture with a polyfunctional coupling agent. The polyblends are useful as plasticizers for film-forming vinyl halide polymers.

31 Claims, No Drawings

MODIFIED POLYESTER POLYBLENDS AND PREPARATION THEREOF

BACKGROUND OF THE INVENTION

Polyesters and their preparation are well known in the art. Terminated polyesters, i.e. polyesters having a high proportion of non-reactive end groups, are ordinarily prepared by the reaction of a dicarboxylic acid with a glycol and a monocarboxylic acid or monohydric alcohol. Non-terminated polyesters are ordinarily prepared by the reaction of a dicarboxylic acid with a glycol.

Polyesters have found many uses in industry, among them being their use as plasticizers for vinyl halide polymers. In certain applications, polyesters are superior to monomer plasticizers since the polyesters tend to volatilize less easily and are usually less extractable by solvents, particularly in film-forming polymer systems. As the needs of industry becomes more and more stringent regarding the plasticization of polymer systems, it has become apparent that many polyester plasticizers must be improved in order to increase their volatility and extractability permanence characteristics.

A variety of methods are known whereby polyesters have been modified to improve their characteristics. One such method has been by the use of monofunctional reagents, e.g., acetic anhydride, to "cap" the reactive hydroxyl groups by acetylation. Such method, however, terminates the chain growth of the polyester, even though improving the extraction and volatility characteristics thereof.

Another method has been the reaction of polyesters with coupling agents, e.g. diisocyanates, which react with the hydroxyl groups present in non-terminated polyesters. The treatment of terminated polyesters with coupling agents has not been previously considered, however, since it was believed that there was an insufficient concentration of reactive hydroxyl radicals in such polyesters to react to any great extent with the coupling agent.

It has now been discovered, however, that terminated polyesters contain species of polyester which are only partially terminated and other species which are essentially non-terminated and that coupling agents will react therewith to provide polyesters of improved plasticizer performance in vinyl halide polymers.

SUMMARY OF THE INVENTION

In accordance with the present invention, it has been found that low molecular weight, terminated polyesters are, in essence, a low molecular weight polyblend of terminated polyester with partially terminated polyester species and substantially non-terminated polyester species. It has been found that if such a low molecular weight polyblend is modified by treatment with polyfunctional coupling agents, there is afforded improved plasticizer performance in vinyl halide polymers.

PRIOR ART

Applicants are aware of the following patents which may be relevant to the compositions of the present invention:

U.S. Pat. No. 2,815,354 discloses the acylation of low molecular weight, acid terminated polyesters containing residual hydroxyl groups to improve migration and leaching characteristics. Monofunctional acylating agents are used.

U.S. Pat. No. 2,650,212 is directed to the preparation of adhesive materials and discloses the reaction of non-terminated polyesters with diisocyanates in the presence of tertiary amines.

U.S. Pat. No. 2,725,366 discloses the modification of linear polyesters with organic diisocyanates. The polyesters utilized are the non-terminated polyesters prepared from the reaction of a dibasic carboxylic acid, a glycol and an amino alcohol or diamine.

U.S. Pat. No. 2,907,752 is directed to the preparation of synthetic, rubbery, isocyanate-modified polyesters which are subsequently cured to form the rubbery polymer.

SPECIFIC EMBODIMENTS OF THE INVENTION

In accordance with the present invention it has been found that low molecular weight, terminated polyesters used as plasticizers in vinyl halide and rubbery polymers are essentially a low molecular weight polyblend of various species of polyesters. Thus, a reaction mixture of dicarboxylic acid, glycol and monocarboxylic acid affords, under proper reaction conditions, a low molecular weight polyblend of polyesters having the formulae 1. $T-G(A-G)_xT$ 2. $T-G(A-G)_x$ 3. $(G-A)_xG-$ wherein T represents the residue of a monocarboxylic acid, G represents the residue of a glycol, A represents the residue of a dicarboxylic acid and $x$ represents an integer.

Similarly, if the reaction mixture is composed of a dicarboxylic acid, glycol and a monohydric alcohol, there is afforded, under proper reaction conditions, a low molecular weight polyblend of polyesters having the formulae 4. $T-A(G-A)_xT$ 5. $T-A(G-A)_xG$ 6. $(G-A)_xG-$ wherein T represents the residue of a monohydric alcohol and G, A and $x$ are defined above.

Further, it has been found that the reaction of those polymeric mixtures or polyblends with polyfunctional coupling agents affords a higher molecular weight polyblend of polyesters of improved plasticizing performance. Such polyester polyblends, if terminated with monocarboxylic acid, have the formulae 1'. $T-G(A-G)_xT$ 2'. $T-G(A-G)_xZ(G-A)_xG-T$ 3'. $\{(G-A)_xG-Z\}_y$ wherein T, G and A are defined in formulae 1, 2 and 3 and wherein Z represents the residue of a polyfunctional coupling agent, $x$ represents an integer having an average value of from about 5 to about 15 and $y$ represents an integer of from 1 to about 12; and, if terminated with a monohydric alcohol, have the formulae

4'. T—A—(G—A)ₓT

5'. T—A—(G—A)ₓG—Z—G—(A—G)ₓA—T

6'. [(G—A)ₓG—Z]ᵧ wherein T, G and A are defined in formulae 4, 5 and 6 and wherein Z represents the residue of a polyfunctional coupling agent, x represents an integer having an average value of from about 5 to about 15 and y represents an integer of from 1 to about 12.

The low molecular weight polyester and oligoester blends which are described above are prepared from any suitable dicarboxylic acids, glycols and monohydric alcohols or monocarboxylic acids.

Typical dicarboxylic acids which are suitable for preparing the low molecular weight polyester and oligoester blends of the invention are those dicarboxylic acids having from 3 to 10 carbon atoms and include such acids as sebacic, azelaic, suberic, pimelic, adipic, glutaric, succinic, isosebacic, dimethyladipic, malonic, phthalic, isophthalic, terephthalic, 3-methyl phthalic, 4-methyl phthalic, 3,4-dimethyl phthalic and the like. Particularly preferred are azelaic and adipic. These dicarboxylic acids may be used individually or in mixtures.

Typical glycols which are suitably used in the preparation of the polyesters and oligoesters of the invention include those glycols having from 2 to about 6 carbon atoms, i.e., ethylene glycol, diethylene glycol, propylene glycol, dipropylene glycol, 1,4-butylene glycol, 1,5-pentanediol, trimethylene glycol, 1,3-butylene glycol, 1,2-butylene glycol, 1,5-pentanediol, 1,6-hexamethylenediol, 2-ethyl-1,3-butanediol and the like, and mixtures thereof. Particularly preferred are 1,2-propylene glycol and 1,3-butylene glycol.

Typical monocarboxylic acids which are utilized to form terminating groups on the polyesters and oligoesters include those monocarboxylic acids having from about 8 to about 18 carbon atoms, e.g. caprylic, pelargonic, capric, lauric, myristic, palmitic, margaric and stearic acids. Preferred acids are those having from 12 to 18 carbon atoms, e.g. lauric, myristic, palmitic, margaric and stearic acids and mixtures thereof. Especially preferred are lauric and palmitic acids and mixtures thereof.

Typical monohydric alcohols which are used to terminate the polyesters include those alcohols having from about 4 to about 12 carbon atoms, e.g. butyl, amyl, hexyl, heptyl, octyl, nonyl, decyl, undecyl and dodecyl alcohols and mixtures thereof. Preferred are alcohols having from 7 to 11 carbon atoms, e.g. 2-ethylhexanol and, especially, mixtures of 7, 9 and 11 carbon atom alcohols.

The polyesters and oligoesters of this invention are prepared by reacting appropriate amounts of the dicarboxylic acid, glycol and either monohydric alcohol or monocarboxylic acid under polyesterification conditions until an acid number of about 10 to about 20 is obtained in the prepolymer stage. Generally, the temperature of esterification is maintained in the range of from about 150° to about 200° C. Usually, an esterification or transesterification catalyst is used, such as titanium tetrachloride, zinc acetate, zinc oxide, stannous oxalate, and the like. The reaction mixture is then further heated in the range of from about 200° to about 210° C. thereby causing transesterification with the removal of excess glycol and alcohol. The reaction is generally completed when the hydroxyl number of the reaction is from about 10 to about 20 and the acid number is within the range of from about 0.5 to about 2. The resulting mixture or polyblend of low molecular weight polyesters and oligoesters are substantially terminated by either alcohol or acid groups but, as shown above, there is a certain percent, usually from about 10 to about 40 percent, of non-terminated and only partially terminated polyesters and oligoesters in the reaction mixture. Preferably, the polyester/oligoester polyblend produced by the initial esterification reaction results in a prepolymer material having a residual hydroxyl functionality equivalent to having about 30 percent to about 75 percent of the polyester chains terminated with one hydroxyl group.

The polyblend of terminated polyester, partially terminated polyester and non-terminated polyester prepared in the above manner (note formulae 1-6) is then reacted with a polyfunctional coupling agent in order to extend the molecular weight of the mixture and provide a reaction product mixture having a viscosity below about 200 stokes at 25° C. and a molecular weight (number average) below about 12,000. Such reaction mixtures are suitable as plasticizers for vinyl halide polymers.

The polyfunctional coupling agents which are used to extend molecular weight and impart suitable plasticizer properties for vinyl halide polymers are those compounds which will react noncatalytically with the active hydrogen ion of residual hydroxyl groups on the polyester at a temperature below which the essential plasticizer properties of the polyester are not degraded. Thus, the polyfunctional coupling agent reacts with the hydroxyl groups of the polyester at a temperature below about 150° C. Above that temperature, the polyester chain is transformed and degraded and does not exhibit plasticizing properties. Examples of polyfunctional coupling agents include aliphatic and aromatic isocyanates, e.g. tetramethylene diisocyanate, hexamethylene diisocyanate, dodecamethylene diisocyanate, cyclohexane diisocyanate, dicyclohexylmethane diisocyanate, tolylene diisocyanate, triphenylmethane triisocyanate, diphenylmethane diisocyanate, butane triisocyanate, benzene triisocyanate, tolylene triisocyanate, tolylene tetraisocyanate; aliphatic and aromatic dicarboxylic acid halides, e.g. oxalyl chloride, glutaryl bromide, sebacyl chloride, succinyl bromide and phthalyl chloride; bis-lactams and bis-lactones, e.g. N,N'-isophthalyoylbis-caprolactam; bis-epoxides; bis-ketenes; carbodiimides e.g. phenylene bis-alkyl carbodiimide; sulfonyl halides, e.g. phenylene bis sulfonyl chloride and the like. Especially preferred are poly(methylene) diisocyanates and dicarboxylic acid chlorides.

The coupling agents are added to the polyester at a concentration calculated to react with approximately 90–95 percent of the free hydroxyl groups in the polyester, i.e. from about 0.9–0.95 of the stoichiometric amount of coupling agent needed to completely react with all residual hydroxyl functionality.

To exemplify the reaction between the coupling agent and the polyester, it may be seen that, for example, a diisocyanate/polyester reaction, wherein the diisocyanate is present in less than the stoichiometric amount relative to the residual hydroxyl functionality of the polyester, may be represented schematically as follows:

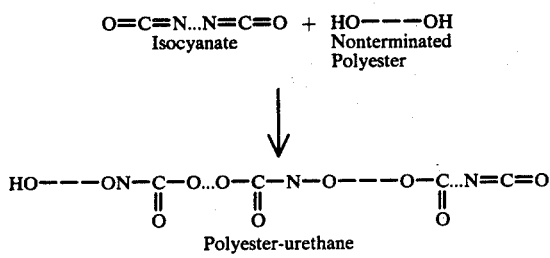

The coupling process involves reaction of the active hydrogen atom of a terminal hydroxyl group of a polyester or oligoester with, for example, an isocyanate group of a diisocyanate to form a urethane grouping between the two reactants. It will be noted that the product illustrated in the above equation has a terminal isocyanate group on one end and a terminal hydroxyl group on the other end. A terminal group of one such molecule is therefore capable of reacting with a terminal group of another molecule, and in this way indefinite chain lengthening of the reaction product is theoretically possible. In the practice of the present invention, there is employed a slight deficiency of the coupling agent and such deficiency serves to foster chain growth, thereby providing a molecule having a statistically greater number of hydroxyl terminated molecules than isocyanate terminated molecules. The molecular weight is held below about 12,000 by the stoichiometry described above.

The following examples illustrate specific, nonlimiting embodiments of the invention.

EXAMPLE 1

This example illustrates the preparation of an acid terminated polyester.

To a 1 liter, 3-necked flask fitted with a stirrer, thermometer and a 3-inch column, were charged 477 g. (5.30 moles) 1,3-butanediol, 365 g. (2.50 moles) adipic acid, 71.4 g. (0.313 moles) myristic acid, 1.0 g. of charcoal and 0.08 g. of titanium tetrachloride. The mixture was heated at atmospheric pressure. At about 145° C., water began to distill from the reaction mass. The temperature was then increased to 195° C. over a 2 hour period and then to 195°-200° C. The pressure was slowly reduced to 400 mm. over a half-hour period.

To promote transesterification, the batch temperature was raised to 205°-210° C. and the vacuum was slowly reduced. The glycol was stripped to a final batch condition of 215° C./2 mm. and this condition was held for about 1 hour. The batch was cooled to 150° C. under vacuum and then 5 g. of Attapulgus earth and 1 g. of filter aid were added. The batch was stirred for ½ hour at 150° C. and filtered. The finished product, 578 g., was a viscous, light-yellow liquid having a viscosity (25° C.) of 30 stokes, an acidity of 1.2 meq/100 gms (Acid No. = 0.7) and a Hydroxyl No. of 18.

EXAMPLE 2

This example illustrates the preparation of an alcohol terminated polyester.

A 5 liter, 3-necked flask equipped with a stirrer, thermometer and 6-inch column was used. The charge was 2,370 g. (16.2 moles) adipic acid, 1,580 g. (17.5 moles) 1,3-butylene glycol, 702 g. (5.4 moles) 2-ethylhexanol and 20 drops of titanium tetrachloride. The batch was heated slowly to reflux, (121° C.) over a 1 hour period. Over the next 3½ hours the batch was heated to 195° C. while 455 g. of water were collected. Pressure was then reduced and the temperature increased to 205° C.

The reaction temperature was then raised to 220° C. and the pressure again lowered. The batch was filtered and dried, yielding 3,270 g. of light colored product. Acidity, 1.4 meq/100 g. (Acid No. = 0.8); viscosity at 25° C., 65 stokes; specific gravity, 1.0996; Hydroxyl No. = 8.

EXAMPLE 3

This example illustrates the reaction of a polyester of the type prepared in Example 1 with tolylene diisocyanate as the coupling agent.

A polyester of the type prepared in Example 1, having an acidity of 2.85 meq/100 g., a viscosity of 30 stokes and a hydroxyl number of 30 was prepared and 200 g. of the polyester was reacted with 5.9 g. of tolylene diisocyanate. The tolylene-diisocyanate was added to the polyester under nitrogen at room temperature and the reaction mixture was gradually heated to a temperature of about 120°-140° C. during a 1 hour period. There was obtained 205 g. of product having a viscosity of approximately 100 stokes (25° C.) and a final acidity of 1.50 meq/100 g.

EXAMPLE 4

This example illustrates the reaction of a polyester of the type prepared in Example 1 with sebacyl chloride.

Two hundred g. of a polyester of the type prepared in Example 1, having an acidity of 2.85, was reacted with 7.8 g. of sebacyl chloride. The sebacyl chloride was added at a temperature of 40° C. and the temperature was gradually raised over a 1 hour period to approximately 130° C. The product had a final acidity of 5.75 meq/100 g.

Similar results are obtained as in Examples 3 and 4 using polyesters of the type prepared in Examples 1 and 2 and various coupling agents, e.g. tetramethylene diisocyanate, cyclohexane diisocyanate, triphenylmethane triisocyanate, benzene triisocyanate, adipoyl chloride, succinyl bromide, phenylene bis alkyl carbodiimide, phenylene bis sulfonyl chloride and N,N'-terephthaloyl bis-caprolactam.

EXAMPLE 5

This example illustrates the comparative properties of a 40 mil sheet of polyvinyl chloride containing 67 phr unmodified polyester plasticizer of the type illustrated in Example 1 as compared with the same sheet of polyvinyl chloride containing a concentration of 67 phr of a polyester of the type illustrated in Example 1 which has been post-acylated by reaction with acetic anhydride to cap residual hydroxyl functionality and 67 phr of the sebacyl chloride coupled polyester of Example 4. The comparative properties of the sheet polyvinyl chloride are set forth in Table 1 below.

Table 1

| Plasticizer | Viscosity (stokes) | Volatility % Plas. Lost | Flex. Temp. (° C.) | Distilled Water Extraction 24 Hr. (50° C.) % Sol. Lost | % Plasticizer Lost by Extraction | |
|---|---|---|---|---|---|---|
| | | | | | 1% Soap 96 Hrs. (50° C.) | Hexane (23° C.) 4 Hrs. |
| Unmodified Polyester | 30 | 2.5 | −21.1 | 0.27 | 12.5 | 1.9 |
| Partially Modified Polyester | 23 | 2.0 | −20.5 | 0.11 | 9.6 | 1.8 |
| Coupled Polyester | 58 | 1.7 | −19.1 | 0.09 | 8.2 | 1.6 |

[1] Geon PVC, B. F. Goodrich Co.

Similar results can be expected when using the polyesters of this invention in vinyl halide copolymers, acrylate and methacrylate polymers, e.g. polymethyl methacrylate and polyethyl acrylate, in polyurethane and in styrene-butadiene rubber.

As can be seen from the data of Table 1, the polyesters of this invention are superior in every permanence test to both the partially modified and the unmodified polyesters. Specifically, the subject polyesters show 47% and 18% lower volatility than the unmodified and acetylated polyesters, respectively; 300% and 22% lower extractibility in distilled water, respectively; 52% and 17% lower extractibility in soapy water, respectively; 18% and 13% lower extractibility in hexane, respectively. An anticipated slight decrease in low temperature flex, due to the higher average molecular weight of the subject polyesters, is noted.

The term "vinyl halide polymer" refers to polymers containing a predominant quantity, that is, a quantity greater than 50 percent by weight, of the polymer as vinyl halide units. This includes the homopolymers of vinyl chloride as well as interpolymers of vinyl chloride with an unsaturated monomer copolymerizable therewith. Other monomers which may be copolymerized with vinyl halide include vinyl-type monomers such as, for example, vinylidene chloride, vinyl esters of carboxylic acids, for example vinyl acetates, vinyl propionate, vinyl butyrate, vinyl benzoate; esters of unsaturated acids, for example alkyl acrylates, such as methyl acrylate, ethyl acrylate, propyl acrylate, butyl acrylate, allyl acrylate and the corresponding esters of methacrylic acid; vinyl aromatic compounds, for example, styrene; esters of α,β-unsaturated carboxylic acids, for example, the methyl, ethyl, butyl, amyl, hexyl, octyl esters of maleic, crotonic, itaconic, fumaric acids and the like.

When the polyblends of the invention are employed as plasticizers, they are ordinarily incorporated into the polymer by mixing, blending or milling.

The proportion of polyester polyblend that may be employed as plasticizer may vary over a great range since it is dependent upon the particular polyester selected, the specific vinyl halide polymer to be plasticized and the final degree of plasticization desired in the polymer.

With these facts in mind, one skilled in the art may use the polyblends of the present invention in a "plasticizing amount", for most purposes this being from about 5 to about 100 parts, and more commonly from 20 to about 60 parts of polyester polyblend per 100 parts polymer.

In accordance with the invention, the polyblends of this invention may be used as the sole plasticizer in vinyl polymer compositions or they may be employed in conjunction with conventional plasticizers such as alkyl phthalates, alkyl phosphates and other monomeric plasticizers as well as other polymeric plasticizers known in the art.

While the invention has been described herein with regard to certain specific embodiments, it is not so limited. It is to be understood that variations and modifications thereof may be made by those skilled in the art without departing from the spirit and scope of the invention.

The embodiments of this invention in which an exclusive property or privilege is claimed are defined as follows:

1. Polyblend comprising (a) an alcohol terminated polyester, (b) a coupled polyester derived from a partially alcohol terminated polyester, and (c) a coupled polyester derived from a non-terminated polyester, said polyblend having a molecular weight below about 12,000 and containing from about 10 percent to about 40 percent (b) and (c) combined.

2. Polyblend of claim 1 wherein said polyester (a) has the formula

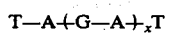

wherein
T represents the residue of a monohydric alcohol;
A represents the residue of a dicarboxylic acid;
G represents the residue of a glycol; and
$x$ represents an integer having an average value of from 5 to 15.

3. Polyblend of claim 2 wherein said monohydric alcohol has from 7 to 11 carbon atoms.

4. Polyblend of claim 3 wherein said alcohol is 2-ethylhexanol.

5. Polyblend of claim 3 wherein said alcohol is a mixture of heptyl, nonyl and undecyl alcohols.

6. Polyblend of claim 2 wherein said glycol has from 2 to about 6 carbon atoms.

7. Polyblend of claim 6 wherein said glycol is 1,2-propylene glycol.

8. Polyblend of claim 6 wherein said glycol is 1,3-propylene glycol.

9. Polyblend of claim 2 wherein said dicarboxylic acid has from 3 to 10 carbon atoms.

10. Polyblend of claim 9 wherein said dicarboxylic acid is adipic acid.

11. Polyblend of claim 9 wherein said dicarboxylic acid is azelaic acid.

12. Polyblend of claim 1 wherein said polyester (b) has the formula

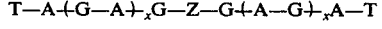

wherein
T represents the residue of a monohydric alcohol;
A represents the residue of a dicarboxylic acid;

G represents the residue of a glycol;
Z represents the residue of a coupling agent; and
x represents an integer having an average value of from 5 to 15.

13. Polyblend of claim 12 wherein said monohydric alcohol has from 7 to 11 carbon atoms.

14. Polyblend of claim 13 wherein said monohydric alcohol is 2-ethylhexanol.

15. Polyblend of claim 13 wherein said monohydric alcohol is a mixture of heptyl, nonyl and undecyl alcohols.

16. Polyblend of claim 12 wherein said dicarboxylic acid has from 3 to 10 carbon atoms.

17. Polyblend of claim 16 wherein said dicarboxylic acid is adipic acid.

18. Polyblend of claim 16 wherein said dicarboxylic acid is azelaic acid.

19. Polyblend of claim 12 wherein said glycol has from 2 to about 6 carbon atoms.

20. Polyblend of claim 19 wherein said glycol is 1,2-propylene glycol.

21. Polyblend of claim 19 wherein said glycol is 1,3-butylene glycol.

22. Polyblend of claim 1 wherein said polyester (c) has the formula

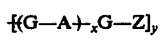

wherein
G represents the residue of a glycol having from 2 to about 6 carbon atoms;
A represents the residue of a dicarboxylic acid having from 3 to 10 carbon atoms;
Z represents the residue of a coupling agent;
x represents an integer having a value of from 5 to 15; and
Y represents an integer having a value of from 1 to about 12.

23. Polyblend comprising
a. a polyester of the formula

b. a polyester of the formula

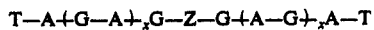

and
c. a polyester of the formula

wherein
T represents the residue of a monohydric alcohol;
G represents the residue of a glycol;
A represents the residue of a dicarboxylic acid;
Z represents the residue of a coupling agent;
x represents an integer having a value of from 5 to 15; and
y represents an integer having a value of from 1 to about 12.

24. Polyblend of claim 23 wherein said monohydric alcohol is 2-ethylhexanol, said glycol is 1,3-butylene glycol, said dicarboxylic acid is adipic acid and said coupling agent is hexamethylene diisocyanate.

25. Composition comprising a vinyl halide polymer and a plasticizing amount of the polyblend of claim 2.

26. Composition comprising a vinyl halide polymer and a plasticizing amount of the polyblend of claim 12.

27. Composition comprising a vinyl halide polymer and a plasticizing amount of the polyblend of claim 22.

28. Composition comprising a vinyl halide polymer and a plasticizing amount of the polyblend of claim 24.

29. Method of in situ preparation of the polyblend of claim 1 which comprises (1) reacting a dicarboxylic acid, an alkylene glycol and a terminator which is a monohydric alcohol under esterification conditions and (2) reacting the reaction mixture of (1) with a polyfunctional coupling agent at a temperature below that temperature at which the properties of said polyblend are degraded.

30. Method of claim 29 wherein said terminator is a mixture of monohydric alcohols.

31. Method of claim 29 wherein said coupling agent is selected from the group consisting of a poly(methylene)diisocyanate and a dicarboxylic acid chloride.

* * * * *